(12) United States Patent
Taylor et al.

(10) Patent No.: US 6,178,038 B1
(45) Date of Patent: Jan. 23, 2001

(54) OPTICAL AMPLIFIER HAVING AN IMPROVED NOISE FIGURE

(75) Inventors: Michael G. Taylor, Laurel; Balakrishnan Sridhar, Elkridge, both of MD (US)

(73) Assignee: Ciena Corporation, Linthicum, MD (US)

( * ) Notice: Under 35 U.S.C. 154(b), the term of this patent shall be extended for 0 days.

(21) Appl. No.: 09/252,288

(22) Filed: Feb. 18, 1999

Related U.S. Application Data

(60) Provisional application No. 60/075,312, filed on Feb. 20, 1998.

(51) Int. Cl.[7] .................................................. H01S 3/00
(52) U.S. Cl. .......................................... 359/341; 359/161
(58) Field of Search .................................. 359/341, 124, 359/161

(56) References Cited

U.S. PATENT DOCUMENTS

| | | | |
|---|---|---|---|
| 5,404,413 | * | 4/1995 | Delavaux et al. .................... 385/15 |
| 5,539,563 | * | 7/1996 | Park ...................................... 359/161 |
| 5,754,334 | * | 5/1998 | Artiglia et al. ....................... 359/332 |
| 5,887,093 | * | 3/1999 | Hansen et al. ........................ 385/27 |

FOREIGN PATENT DOCUMENTS

| | | |
|---|---|---|
| 0734105 | 9/1996 | (EP) . |
| 0903877 | 3/1999 | (EP) . |

OTHER PUBLICATIONS

Aida, K., et al., "Design and Performance of a Long–Span IM/DD Optical Teansmission System Using Remotely Pumped Optical Amplifiers", IEE Proceedings J. Optoelectronics, vol. 137, No. 4, 1990, pp. 225–229.

PCT International Search Report, Feb. 7, 1999.

* cited by examiner

*Primary Examiner*—Mark Hellner
(74) *Attorney, Agent, or Firm*—David L. Soltz

(57) ABSTRACT

A dispersion compensating element, such as a dispersion compensating fiber, is provided between two erbium doped fiber segments of a two stage amplifier, and is pumped with light of a sufficient wavelength and intensity to yield Raman amplification within the dispersion compensating fiber. As a result, optical loss of the dispersion compensating fiber is reduced and the overall noise figure of the amplifier is improved.

8 Claims, 2 Drawing Sheets

OPTICAL AMPLIFIER HAVING AN IMPROVED NOISE FIGURE

This application claims priority of U.S. Provisional Application Serial No. 60/075,312 filed Feb. 20, 1998.

BACKGROUND OF THE INVENTION

The present invention is directed toward optical amplifiers, and doped fiber optical amplifiers in particular.

Optical amplifiers including erbium doped optical fibers are currently being used to amplify weak optical signals in fiber optic communication networks. In these optical amplifiers, carriers in the rare-earth doped fiber are excited with pump light at a wavelength different than the communication signals. When the communication signals enter the doped fiber, the carriers "fall" back to a lower energy state, and release a photon at the communication signal wavelength in the process, thereby providing optical amplification and gain.

Two stage optical amplifiers have been proposed, which can include two segments of erbium doped fiber spaced by a relatively short length of undoped fiber. The first segment of doped fiber, i.e., the first stage, can be pumped with an appropriate wavelength and at a sufficient intensity to provide high gain, but low noise, while the second segment of doped fiber (the second stage) is pumped to provide high power. Accordingly, the output of such two-stage amplifiers have increased power but relatively little noise.

As optical signals propagate over long distances of optical fiber, chromatic dispersion can occur, whereby optical pulses constituting the optical signals tend to spread out due to spectral components of each pulse propagating through the fiber at different speeds. In order to offset chromatic dispersion, dispersion compensating fiber, commercially available from Corning Inc., can be provided between the first and second erbium doped fiber segments of a two stage amplifier. The length of dispersion compensating fiber to be incorporated between the two amplifier stages depends on the spacing between amplifiers in the optical communication network. In general, however, amplifiers spaced by 100 km of fiber, require approximately 15 km of dispersion compensating fiber, which can impose significant loss.

Two stage fiber amplifiers are often characterized by a parameter referred to as a noise figure (NF) defined as follows:

$$NF = \log(NF_1 + (NF_2/G_1)L),$$

where $NF_1$ and $NF_2$ are the noise figures of the first and second stages, respectively, $G_1$ is the gain of the first stage, and L is the loss associated with the dispersion compensated fiber between the two stages. If dispersion compensating fiber is incorporated mid-stage in a two stage fiber amplifier, the loss term L in the above formula typically increases. As a result, the overall noise figure of the amplifier (NF) also increases and amplifier performance is degraded.

As can be seen from the above formula, noise figure NF can be reduced by increasing the gain of the first stage of the amplifier $G_1$ Increasing gain $G_1$ excessively, however, will lead to high signal power levels that cause known non linear effects, such as cross-phase modulation and four-wave mixing that degrade optical signal quality. Thus, the amount that gain $G_1$ can be increased is limited, and may not sufficiently improve noise figure NF.

SUMMARY OF THE INVENTION

Consistent with the present invention, an optical amplifier is provided which comprises a dispersion compensating element coupled to an amplification stage. The amplification stage is configured to be coupled to an optical communication path, and receives at least one optical signal. The optical signal is output from the amplification stage in amplified form. The dispersion compensating element receives the amplified optical signal, and has an associated optical gain to thereby minimize the loss of the dispersion compensating element.

BRIEF DESCRIPTION OF THE DRAWINGS

Advantages of the present invention will be apparent from the following detailed description of the presently preferred embodiments thereof, which description should be considered in conjunction with the accompanying drawings in which.

DETAILED DESCRIPTION

In accordance with an aspect of the present invention, a dispersion compensating element, such as a dispersion compensating fiber, is provided between two erbium doped fiber segments of a two stage amplifier, and is pumped with light of a sufficient wavelength and intensity to yield Raman amplification within the dispersion compensating fiber. Accordingly, the loss term L, in the above amplifier noise figure formula is reduced, if not equal to zero, and the noise figure of the amplifier is improved.

Figure 1:
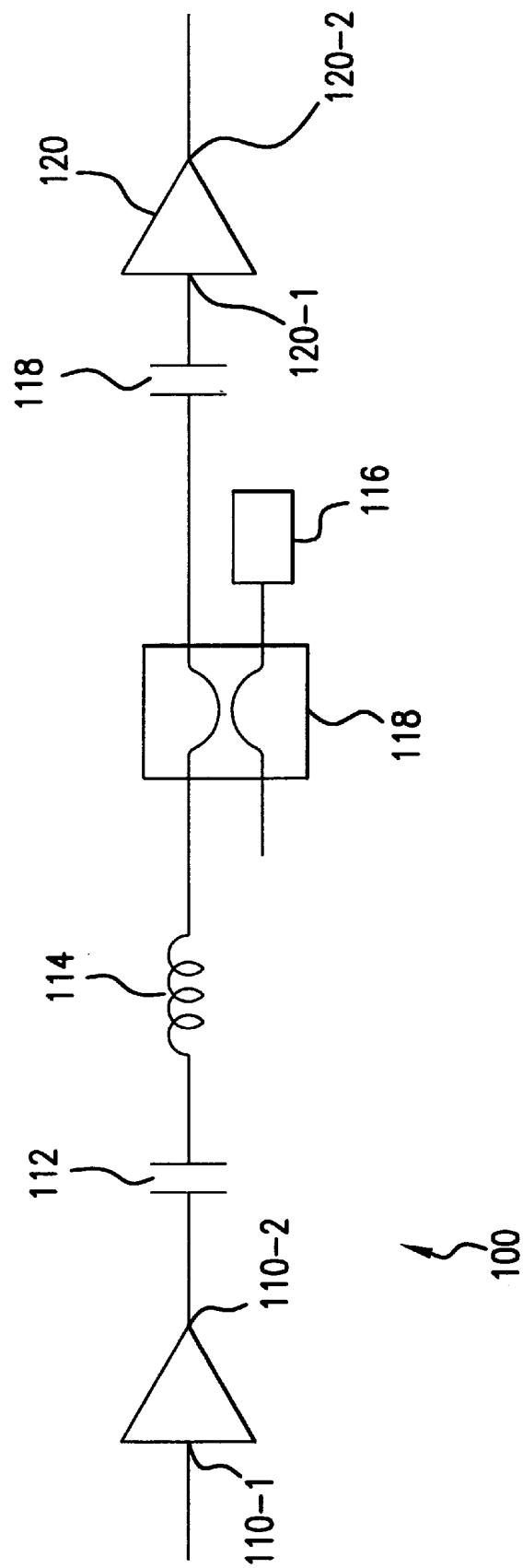
FIG. 1 illustrates an optical amplifier in accordance with a first exemplary embodiment of the present invention.

Turning to the drawings in which like reference characters indicate the same or similar elements in each of the several views, FIG. 1 illustrates a first exemplary embodiment of an amplifier 100 in accordance with the present invention. Amplifier 100 includes a first stage 110 receiving weak optical communication signals at input 110-1 and generating amplified optical communication signals at output at 110-2. Stage 110 includes a first erbium doped fiber, pumped with light of a sufficient wavelength, e.g., 980 nm or 1480 nm, and power so that high inversion of the erbium ions is achieved, thereby yielding the high gain and low noise discussed above. The amplified optical communication signals are supplied via a connector 112 to dispersion compensating fiber 114. In accordance with a feature of the present invention, light is supplied from a laser via coupler 118 into dispersion compensating fiber 114 so that the fiber has an associated optical gain. Typically, this optical gain is Raman amplification.

The wavelength of light supplied to dispersion compensating fiber 114 is selected, at least in part, based on the wavelength of the optical communication signals. Generally, the optical communication signals are at a wavelength between 1525 and 1570 nm, the absorption minimum of most silica based optical fibers. In which case, the wavelength of light output from laser 116 is typically about 1450–1480 nm to provide appropriate Raman amplification at the optical communication signal wavelengths. As indicated above, the Raman amplification in dispersion compensating fiber 114 offsets the loss associated with the DCF and improves the overall noise figure of amplifier 100. In the example shown in FIG. 1, the light emitted from laser 116 counter-propagates through dispersion compensated fiber 114 in a direction opposite the propagation of the optical communication signals. However, it is also considered within the scope of the present invention, that the light output from laser 116 can be co-propagated with the optical communication signals. In which case, coupler 118 is provided between fiber 114 and first amplification stage 110 and configured so that the pump light output from laser 116 propagates in the same direction as the optical communication signals. Coupler 118 may be, for example, either a fiber coupler or a coupler including a dielectric filter, both of which are commercially available.

After propagating through dispersion compensating fiber 114, the communication optical signals next traverse connector 118 and are input to second stage 120. Second stage 120, like first stage 110, has an input 120-1 receiving the optical communication signals, and an output 120-2 supplying the optical communication signal in further amplified form. Second stage 120 also includes an optically pumped erbium doped fiber. However, second stage 120 is pumped with light at a sufficient wavelength and intensity to generate a high output power.

Thus, the optical signals output from second stage 120 have high output power, low noise, and are dispersion compensated. Moreover, since dispersion compensated fiber 114 has low loss due to Raman amplification, the overall noise figure (NF) of amplifier 100 is reduced.

Figure 2:
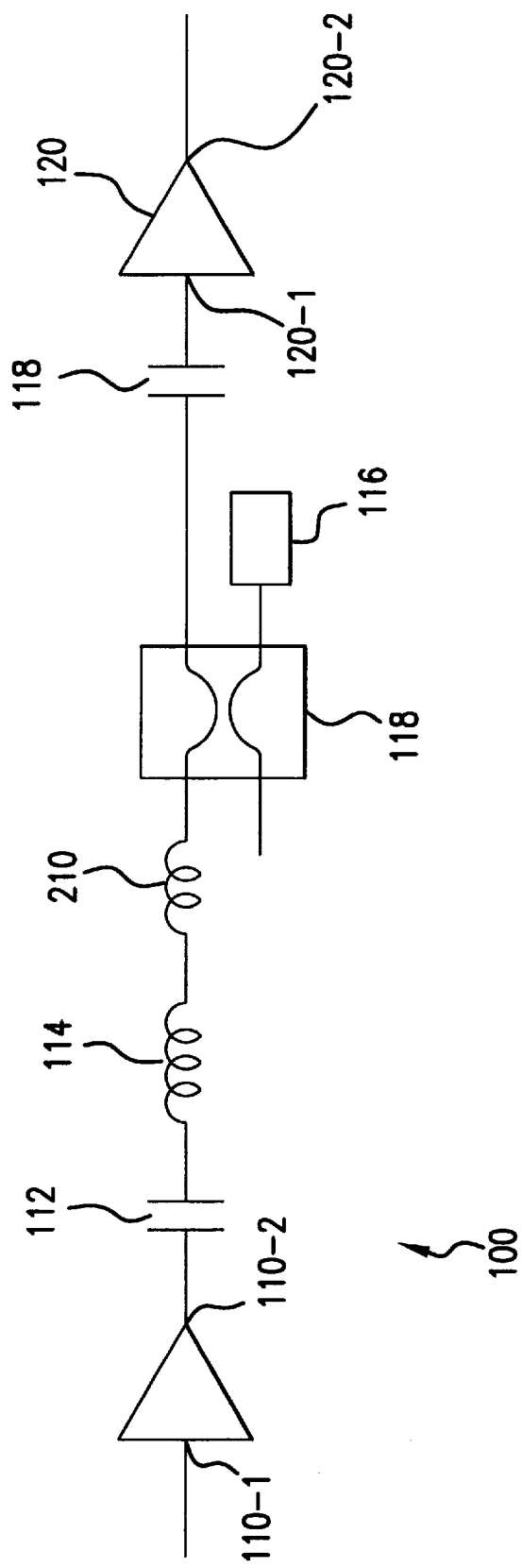
FIG. 2 illustrates an optical amplifier in accordance with a second exemplary embodiment of the present invention.

FIG. 2 illustrates a further embodiment of the present invention whereby a segment of erbium doped fiber 210 is provided intermediate dispersion compensated fiber 114 and coupler 118, and also pumped with light output from laser 116. Fiber 210 provides an additional low noise high/gain stage at the input to high output power stage 120, which can have high noise. Typically, the length of fiber 210 should be relatively short to allow a sufficient amount of light from laser 116 to reach fiber 114 and generate Raman amplification. Doped fiber 210 can also be provided intermediate the ends of fiber 114.

Typically, first stage 110 provides 24 dB of gain and has a noise figure ($NF_1$) of 3.6 dB due to insertion loss from an isolator (not shown) and the quantum noise limit of first stage 110. When pumped with light from laser 116, dispersion compensated fiber 114 can provide approximately 4–5 dB of gain.

Optical amplifier 100 is suitable for amplification of high data rate signals in excess of 10 Gbit/sec. Moreover, a plurality of optical signals at different wavelengths can be input to amplifier 100 and amplified simultaneously. Thus, the present invention can be used in conjunction with wavelength division multiplexed (WDM) systems. In such systems, however, the overall gain of amplifier 100 should be the same for each wavelength, i.e., the gain should be spectrally uniform or flat. As discussed, for example, in U.S. Pat. No. 5,696,615, incorporated herein by reference, two stage gain flattened amplifiers can be achieved by providing first and second erbium doped fiber with complementary gain vs. wavelength curves. The present invention, however, provides an additional technique for achieving gain flatness. In particular, the intensity and wavelength of light supplied by laser 116 can be adjusted to alter the Raman gain of dispersion compensated fiber 114 so that the optical signals output from amplifier 100 have substantially uniform gain.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. An optical amplifier comprising:

a first amplification stage configured to be coupled to an optical communication path, said amplification stage receiving a plurality of optical signals, each of which being at a respective one of a plurality of wavelengths said first amplification stage having an associated first optical gain and outputting said plurality of optical signals a dispersion compensating element coupled to said amplification stage and receiving said amplified plurality of optical signals, said dispersion compensating element further having an associated second optical gain and outputting said plurality of optical signals; and a second amplification state receiving said plurality of optical signals from said dispersion compensating element, said second amplification stage having an associated third optical gain, said associated second optical gain being adjusted so that said plurality of optical signals output from said optical amplifier have substantially uniform optical gain.

2. An optical amplifier in accordance with claim 1, wherein said dispersion compensating element comprises a segment of dispersion compensating fiber.

3. An optical amplifier in accordance with claim 2, further comprising:

a source of pump light; and an optical coupler coupled to said source of pump light and said dispersion compensating fiber, said optical coupler supplying said pump light to said dispersion compensating fiber to thereby effectuate said associated second optical gain.

4. An optical amplifier in accordance with claim 3, wherein said associated optical gain is Raman optical gain.

5. An optical amplifier in accordance with claim 3, wherein said optical coupler is interposed between said first stage of said optical amplifier and said dispersion compensating element.

6. An optical amplifier in accordance with claim 3, wherein said optical coupler is interposed between said second stage of said optical amplifier and said dispersion compensating element.

7. An optical amplifier in accordance with claim 3, further comprising a segment of optical fiber doped with a fluorescent material coupled between said dispersion compensating element and said optical coupler, said segment of doped optical fiber being further supplied with said pump light and providing further optical gain in response thereto.

8. A method of amplifying a plurality of optical signals, each of which being at a respective one of a plurality of wavelengths, said method comprising the steps of:

supplying said plurality of optical signals to an amplification stage of an optical amplifier;

amplifying said plurality of optical signals with said amplification stage of said optical amplifier;

supplying said amplified plurality of optical signals to a dispersion compensating fiber;

supplying a pump light to said dispersion compensating fiber to thereby effectuate optical gain within said dispersion compensating fiber; and controlling an intensity of said pump light such that said plurality of optical signals output from said optical amplifier have substantially uniform gain.

* * * * *